UNITED STATES PATENT OFFICE.

AUGUST T. SCHUESSLER, OF NEWARK, NEW JERSEY, ASSIGNOR OF ONE-HALF TO VICTOR ZEIS, OF NEW YORK, N. Y.

PROCESS OF TREATING SPENT LIME FROM GAS-WORKS FOR CYANIDES.

SPECIFICATION forming part of Letters Patent No. 277,851, dated May 15, 1883.

Application filed March 7, 1883. (No specimens.)

*To all whom it may concern:*

Be it known that I, AUGUST THEODORE SCHUESSLER, a citizen of the United States, residing at Newark, in the county of Essex and State of New Jersey, have invented new and useful improvements in the utilizing of spent lime from gas-works with the view of revivification of the same for further purification of illuminating-gases, of which the following is a specification.

The object of my invention is to treat foul lime of gas-works to regenerate the lime and separate therefrom and utilize the constituents of the impurities; and it consists in combining the following steps in regular sequence, to wit:

First. Leaching with hot water the soluble impurities from the lime.

Second. Treating the liquor containing these impurities in a closed vessel with a stream of carbonic-acid gas. The sulphureted hydrogen is then passed off to a box or chamber, where it may be absorbed by the oxide of iron in its hydrated state, or it may be converted directly into sulphuric acid.

Third. The residual matter in the first chamber, consisting of sulpho-cyanide of lime, is then decomposed by the addition thereto of the commercial salt of sulphate of potash. The liquor is then separated from the gypsum or sulphate of lime, and is evaporated to form a salt for the manufacture of ferro-cyanides.

In carrying out my invention I take the spent or foul lime of gas-works and leach therefrom the impurities by the use of steam or hot water, and thereby obtain a most concentrated solution of the impurities as well as a thorough extraction of the same. After the lime has been treated in about four leaching-vats it will be perfectly deprived of its admixture of foreign substances. It is then kilned and re-burned to be used over again. The mother-liquor holding the sulphurets and sulpho-cyanides in solution is treated in a closed vessel with a stream of carbonic-acid gas, which liberates an equivalent quantity of sulphureted hydrogen. This is passed or led off to a chamber or box and absorbed by oxide of iron in its hydrated state, or left to be treated in the usual way to obtain its sulphuric acid. The residuum in the first chamber will consist of sulpho-cyanide of lime, which I decompose by the addition of commercial sulphate of potash. Gypsum or sulphate of lime is precipitated, from which the liquor is decanted or separated and evaporated to form the cyanide of potash.

By this process I am enabled to economically restore the lime for reuse, and to obtain the ingredients of the impurities in a commercial form, and thereby obviate the accumulation of waste materials, which create a nuisance.

What I claim as new, and desire to secure by Letters Patent, is—

The method herein described of treating the spent lime of gas-works for obtaining potassium-cyanide, consisting in, first, disolving and leaching the soluble substances from the lime; second, treating the mother-liquor thus obtained with a stream of carbonic-acid gas and separating the sulphureted hydrogen from the same; third, decomposing the residuum by adding thereto the commercial salt of sulphate of potash and then removing the precipitate, and finally evaporating the moisture, as set forth.

AUGUST THEODORE SCHUESSLER.

Witnesses:
CARL LINK,
H. FREEMAN NEEFUS.